United States Patent
Clark

(10) Patent No.: US 6,725,894 B2
(45) Date of Patent: Apr. 27, 2004

(54) TRACTION DEVICE

(75) Inventor: Larry C. Clark, Portland, OR (US)

(73) Assignee: Burns Bros., Inc., Lake Oswego, OR (US)

(*) Notice: Subject to any disclaimer, the term of this patent is extended or adjusted under 35 U.S.C. 154(b) by 0 days.

(21) Appl. No.: 10/251,593

(22) Filed: Sep. 20, 2002

(65) Prior Publication Data

US 2004/0055684 A1 Mar. 25, 2004

(51) Int. Cl.[7] .............................................. B60C 27/10
(52) U.S. Cl. ........................ 152/217; 152/219; 152/239
(58) Field of Search ................................. 152/170, 173, 152/175, 177, 185, 217, 219, 231, 239, 241

(56) References Cited

U.S. PATENT DOCUMENTS 1,269,921 A * 6/1918 Frambach 6,047,754 A * 4/2000 Drum .................... 152/219 X
6,085,816 A * 7/2000 Clark et al. ............ 152/219 X

FOREIGN PATENT DOCUMENTS

DE 3307803 * 9/1984

* cited by examiner

Primary Examiner—Russell D. Stormer
(74) Attorney, Agent, or Firm—Schwabe, Williamson & Wyatt, P.C.

(57) ABSTRACT

A traction device for a dual wheel set. The traction device includes side-members and cross-members, the side-members fitted to the inner side of an inside wheel and the outer side of an outside wheel. A cinch line extended around the dual wheel set at the juncture between the wheels and provided with engaging ends configured to draw the ends together in a cinching action to draw the cross-members into the juncture and thereby tighten the traction device on the dual wheel set.

8 Claims, 7 Drawing Sheets

TRACTION DEVICE

FIELD OF THE INVENTION

Traction device for vehicle tires sometimes referred to as tire chains and particularly that type of traction device intended for application to dual wheel sets most frequently mounted on large trucks.

BACKGROUND OF THE INVENTION

Dual wheels are two wheels mounted in a side-by-side relation and mounted on a common axle. Such wheels double the area of surface engagement and provide the advantage of greater load-bearing capacity and greater traction for driving and/or braking the vehicle, typically found on large trucks intended for hauling heavy loads.

With such an arrangement of dual wheels, the procedure of "chaining" the wheels is made substantially more difficult. The wrap around devices for such "chaining" are doublewide for simultaneous chaining of both tires. The operator/driver has to secure the chain at the inside of the inside wheel and the outside of the outside wheel, taking up slack as best as he is able with considerable effort.

BRIEF DESCRIPTION OF THE INVENTION

The present invention, in a preferred embodiment, provides a dual wheel traction device that includes interconnected cable members. There is a pair of side cables that encircle the inside of the inside wheel and the outside of the outside wheel. Loops of cable are provided for each side cable with each loop having its two ends anchored in spaced apart relation to the same side cable. Opposing loop centers meet at the juncture between the two wheels and are secured together by connectors. There are multiple cable loops from each side cable joined at their centers by connectors which connections overlay the space between the dual wheel tires.

Each of the connectors have an inwardly projected loop or eyelet and a cinching or tensioning line slideably projects through the multiple eyelets to encircle the tire walls at the juncture between the tires. Provision is made for the cinching line to be cinched i.e., the circumference of the cinching line is tightened around the tire which serves to draw the connectors and thus the cable loop centers into the space between the tires. This tightens the cable loops to remove undesired slack.

It will be appreciated that the invention is directed to the manner by which the dual wheel chain is tightened, tensioned or cinched onto the dual wheels and is applicable to a number of dual chain types. One such variation is a ladder-type dual chain which has cross members in the form of elongate cables for chains that cross from one side member to the other. Each side member is fitted with a connector at its mid-point, i.e., between the tires, and each connector includes a slide-loop or eyelet that receives a tensioning/cinch line extended around the circumference of the tires. It will also be appreciated that the side members and cross members may be cables or interconnected chain links or combinations of the two.

The invention and its numerous variations will be more fully understood and appreciated with reference to the detailed description provided hereafter.

DETAILED DESCRIPTION OF THE PREFERRED EMBODIMENT

Figure 1:
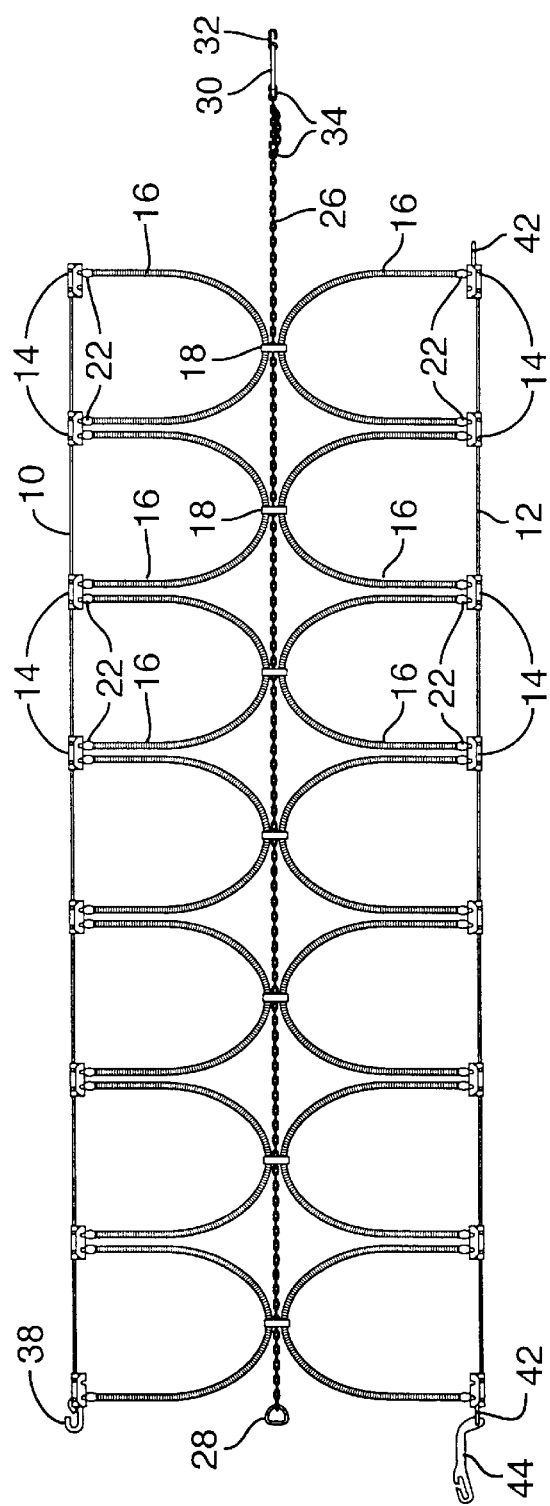
FIG. 1 is a view of a traction device of the present invention as if spread out on a floor or road prior to mounting it to a dual wheel set.
Figure 2:
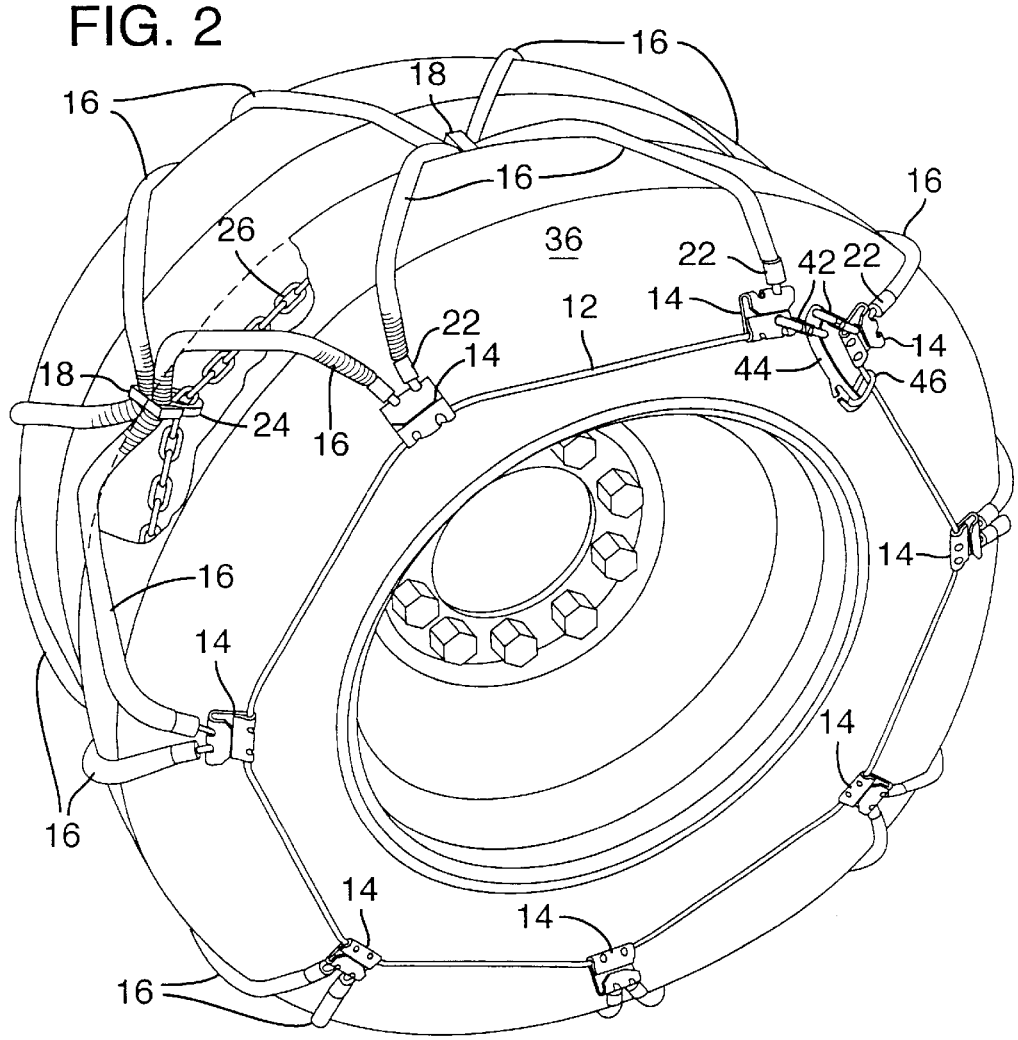
FIG. 2 is a front prospective view of the traction device of FIG. 1 after being mounted to the tires of a dual wheel set.

With reference to FIGS. 1 and 2, illustrated in FIG. 1 is a traction device of the present invention as spread out on a support surface, and FIG. 2 illustrates the same traction device mounted to a set of dual wheels, the wheels coupled together as if mounted on a drive axle of a large truck.

Figure 3:
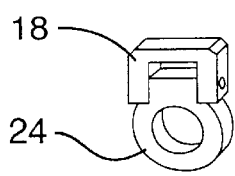

The traction device illustrated is a type referred to as a cable type and includes an inside side cable 10 and an outside cable 12. Spaced along the side cables are cross-member eyelets 14. Cable loops 16 have opposed ends that are secured to the eyelets 14 and the loop 16 of inside and outside cables 10, 12 are connected together at the apex of the loop 16 by connectors 18. A connector 18 is shown in greater detail in FIG. 3 (apart) and FIG. 4 (assembled), and will be further described in connection with the explanation of mounting the traction device to a dual wheel set in a following section.

Figure 4:
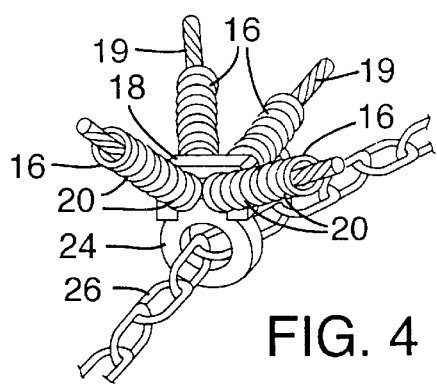
Figure 6:
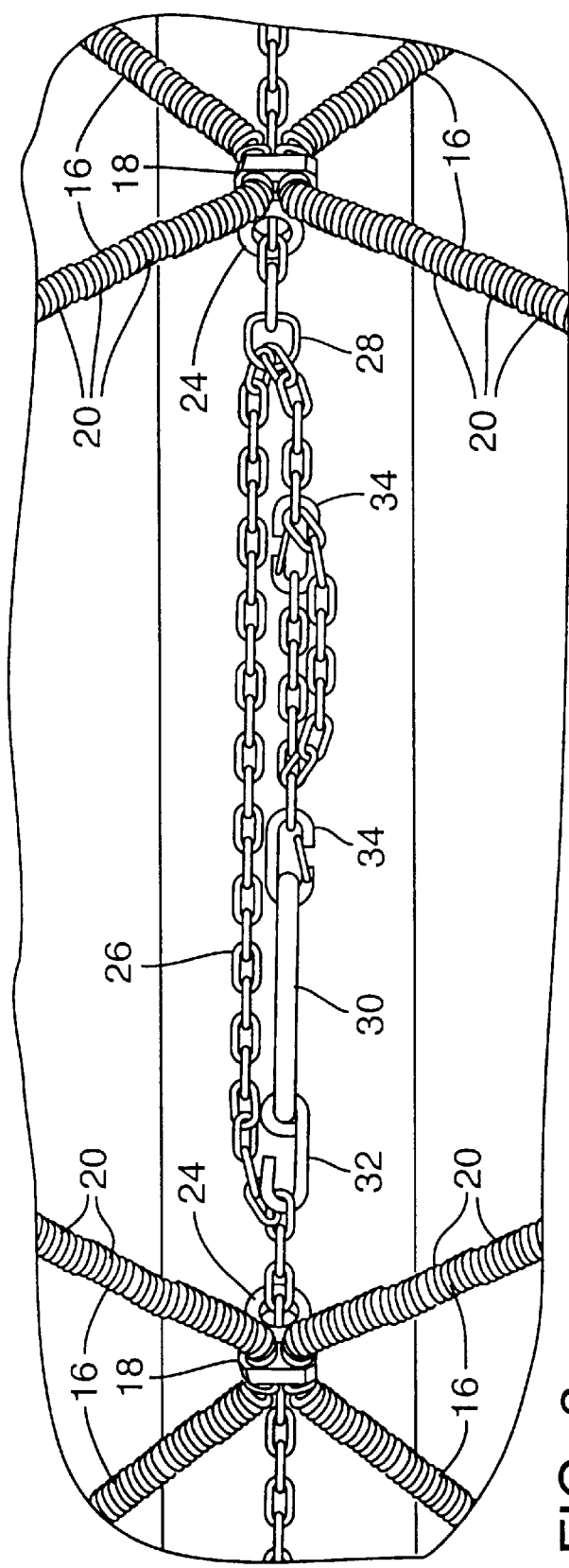
Figure 6A:
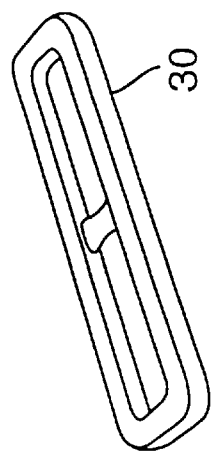

The cable loops 16 as connected at their respective ends to the opposing side cables 10, 12 via cross-member eyelets 14, and as connected together at their apex via connectors 18, form the traction device cross-members. As will be particularly noted in FIG. 4, the cable loops include center strands 19 provided with spring segments 20 that surround the cable strands 19, the spring segments being spaced from the cable ends by spacers 22. (FIGS. 1 and 2) The spring segments enhance gripping of the tires on ice or snow laden roadways as known to the art and disclosed in U.S. Pat. No. 6,035,912. The connectors 18 as particularly seen in FIGS. 3, 4 and 6 include an eyelet 24. A cinch line 26 is extended through the eyelets 24 of the plurality of connectors 18 as seen in FIGS. 1, 4 and 6. In this preferred embodiment, the cinch line 26 is a link type chain that is cooperatively formed relative to the opening of eyelet 24 to allow free passage of the cinch line through the eyelet 24.

Referring particularly to FIG. 6, one end of the cinch line is provided with a slide ring 28 and the other end (ref. nos. 30, 32, 34) is cooperatively configured to slide through the slide ring 28. This other end is provided with a rubber gripping handle 30, having an end hook 32. A pair of snap links 34 provide the connection of the gripping handle 30 to the link chain of the cinch line. The snap links 34 enable adjustment of the overall length of the cinch line as will be apparent.

Figure 7:
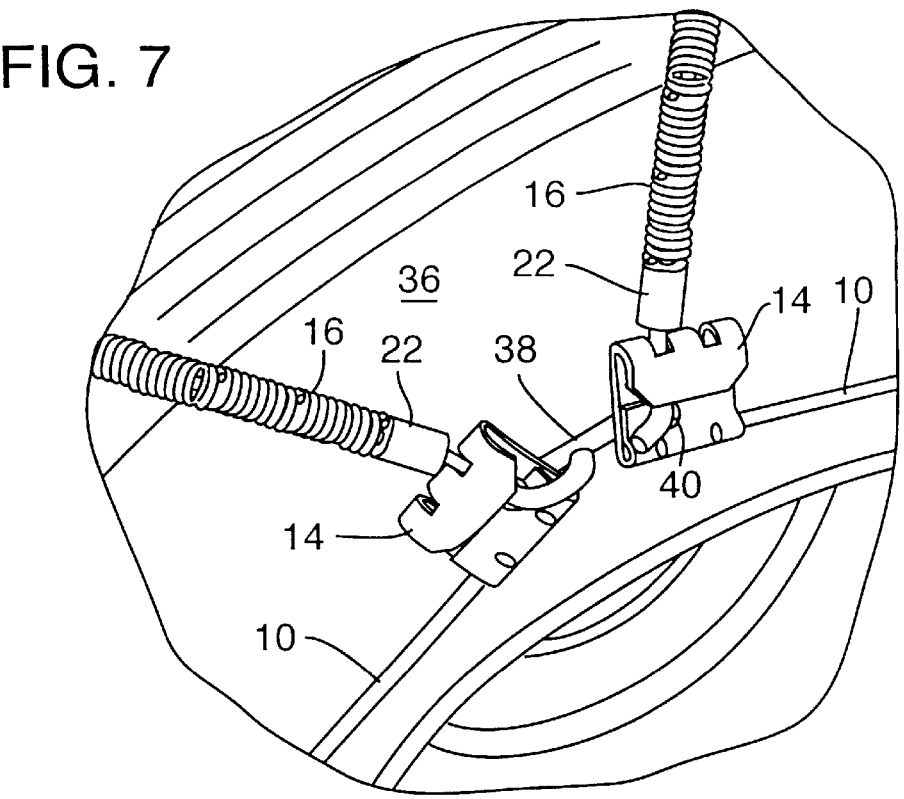
Figure 8:
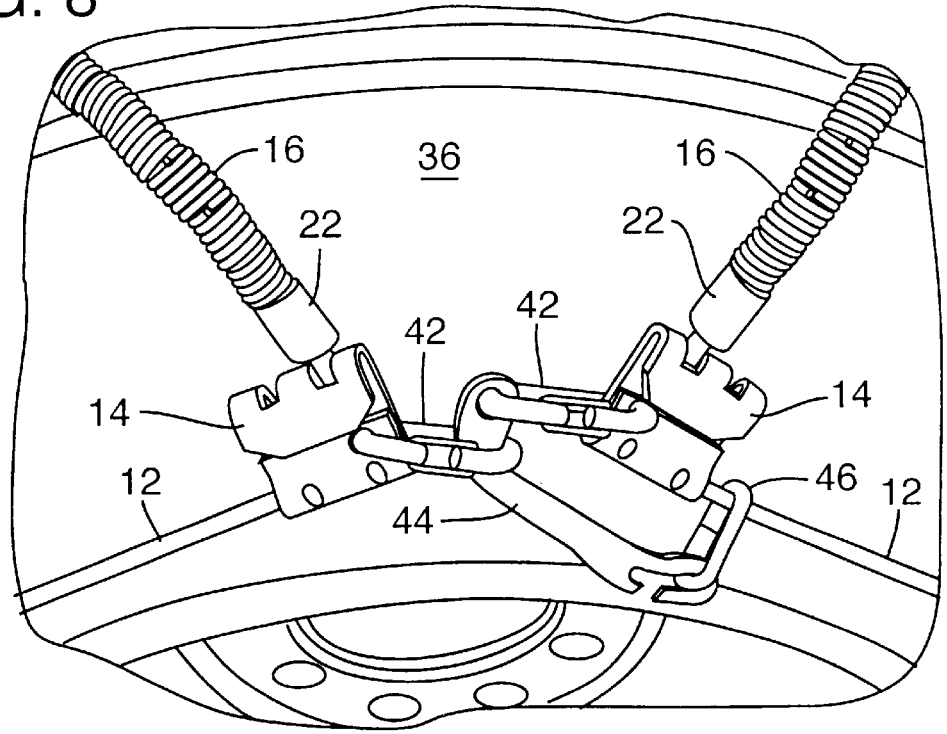

The procedure for mounting the above traction device to the tires 36 of the illustrated dual wheel set will now be explained. With reference to FIG. 1, the traction device is laid down in front of or behind the dual wheels and the truck is moved to position the dual wheels at a mid position of the device. Preferably one end of the device is longer and that end is pulled up and over the tires of the dual wheel set. As seen in FIG. 7, one of the non-connected ends of the inside cable 10 is provided with a hook 38 and that end is hooked into a receiving hole 40 in the eyelet 14 at the opposite end of the inside cable 10.

With the inside side cable ends connected (as seen in FIG. 7), the outside side cable ends are pulled together. (See FIG.

8) A snap link 42 carried by a cross-member connector 14 is engaged by an over-center latch 44 (secured to the opposing connector 14 by another snap link 42) and the over-center latch is drawn through the snap link and secured to the side cable by a keeper link 46.

Figure 5:
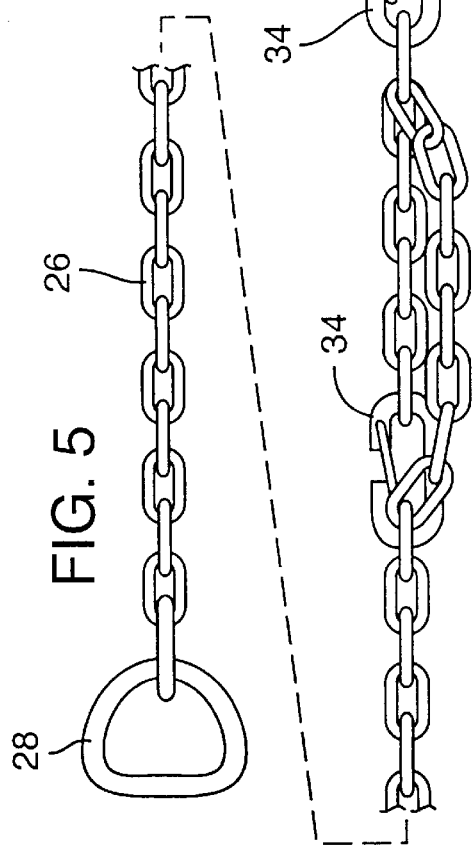
FIGS. 3–8 are views illustrating the different components of the traction device of FIG. 2 and to explain the steps of mounting the traction device of FIG. 1 to the dual wheels as shown in FIG. 2.

The two ends of the traction device accordingly being connected, the operator is ready to cinch down the device. References made to FIGS. 1, 2, 4, 5 and 6 which best illustrate the cinch line 26. It is assumed that the desired length at the handle end 30 has been previously determined and the snap links 34 properly secured to the appropriate links of the cinch line. (See FIG. 5) The ends of the cinch line have been positioned in close adjacency by having connected the ends of the side cables. The handle 30 and hook 32 are inserted through the slide ring 28 and the handle pulled back through the slide ring 28 in a cinch like manner and to the extent that the cinch line may tend to slide around the tires through the eyelets 24, the slide ring 28 is oversized and will not pass through the eyelets of the connectors. (See FIG. 6) The driver/operator in continued pulling of the handle end through the slide ring will produce tightening of the cinch line around the tires and thus the joined apexes of the cable loops 16 are pulled into the space between the tires as seen in FIG. 2. When sufficiently tightened, the end hook 32 is hooked onto a chain link of the cinch line (see FIG. 6) and the tightness of the traction device is secured and made ready for traveling.

Figure 9:
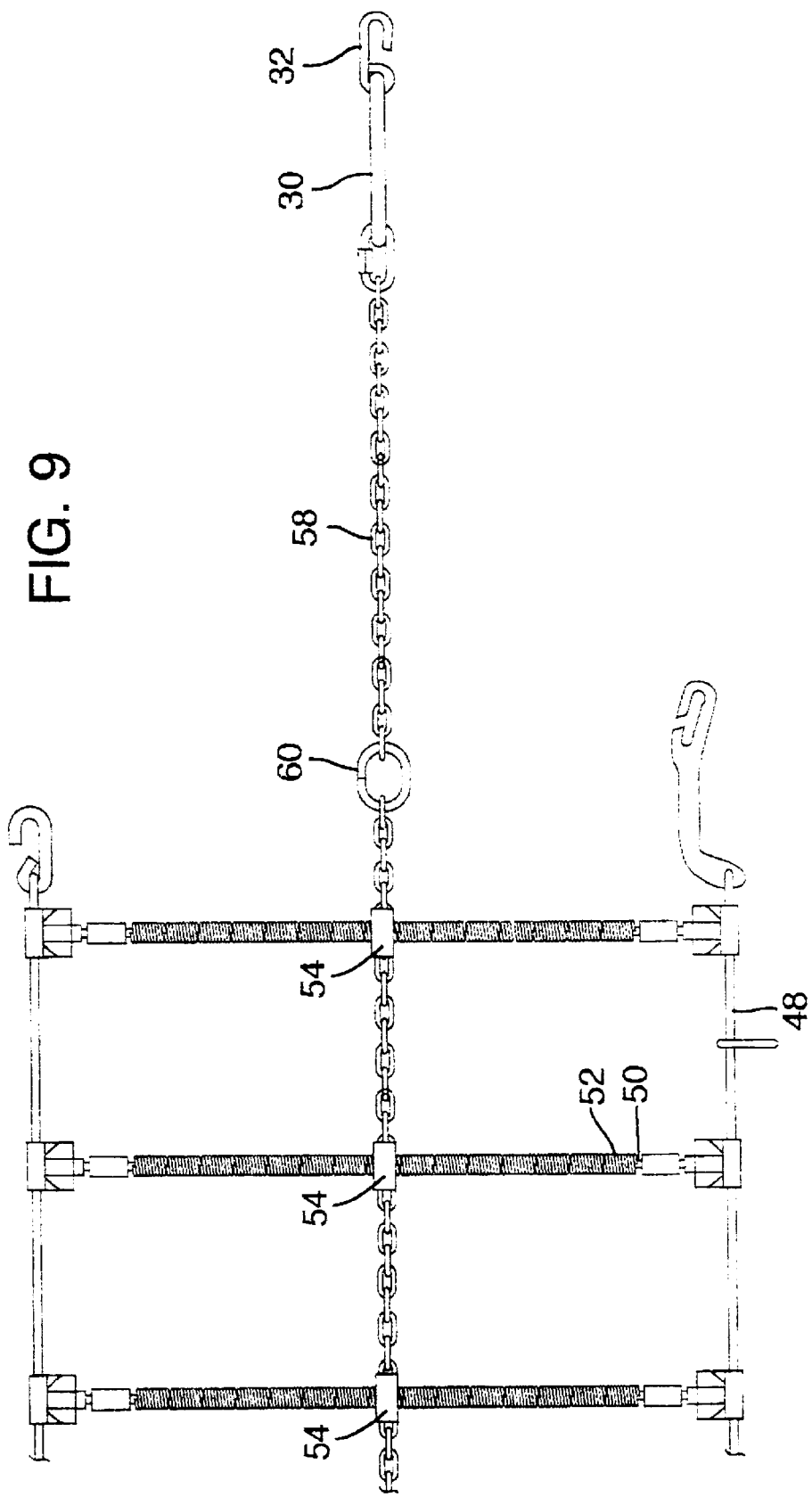
FIGS. 9–12 are illustrations of additional embodiments of the invention.
Figure 10:
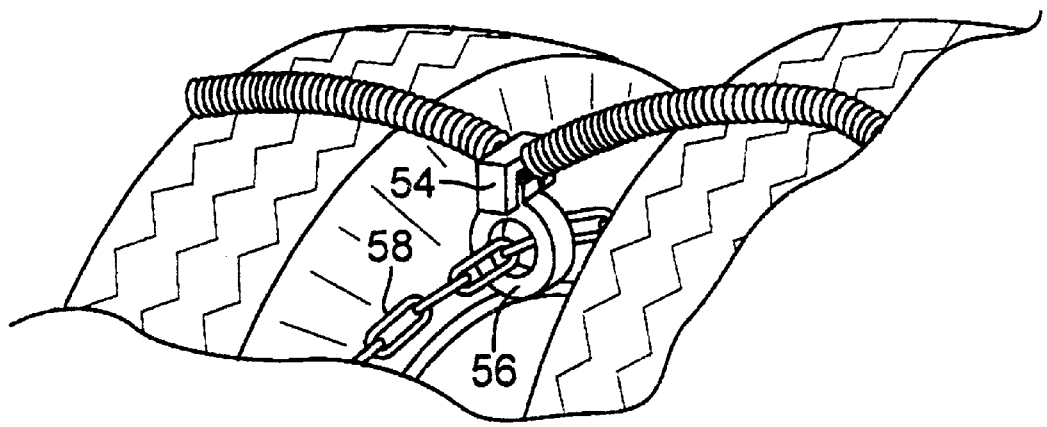

The reader will understand that this invention will apply to numerous traction device types and variations thereof. Examples of such alternative traction device types are illustrated in FIGS. 9–12. Reference is first made to the traction device type of FIGS. 9 and 10. FIG. 9 illustrates a ladder type tire chain wherein the side members 48 and cross members 50 are cables, the cross members 50 being fitted with spring segments 52 as known to the art. Located at a center position of the cross members 50 and between two spring segments 52 is a connector 54 which can be seen in more detail in FIG. 10. The connector is attached to the cross member and includes an eyelet 56 sized to permit a cinch line 58 (of interconnected chain links) to slide lengthways through the eyelet in the manner described for the embodiment of FIG. 1.

Figure 12:
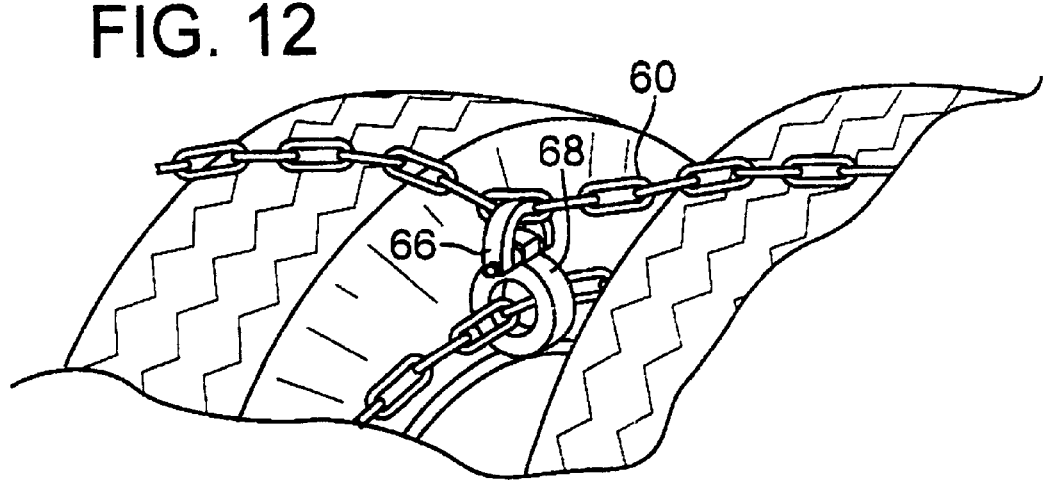
Figure 11:
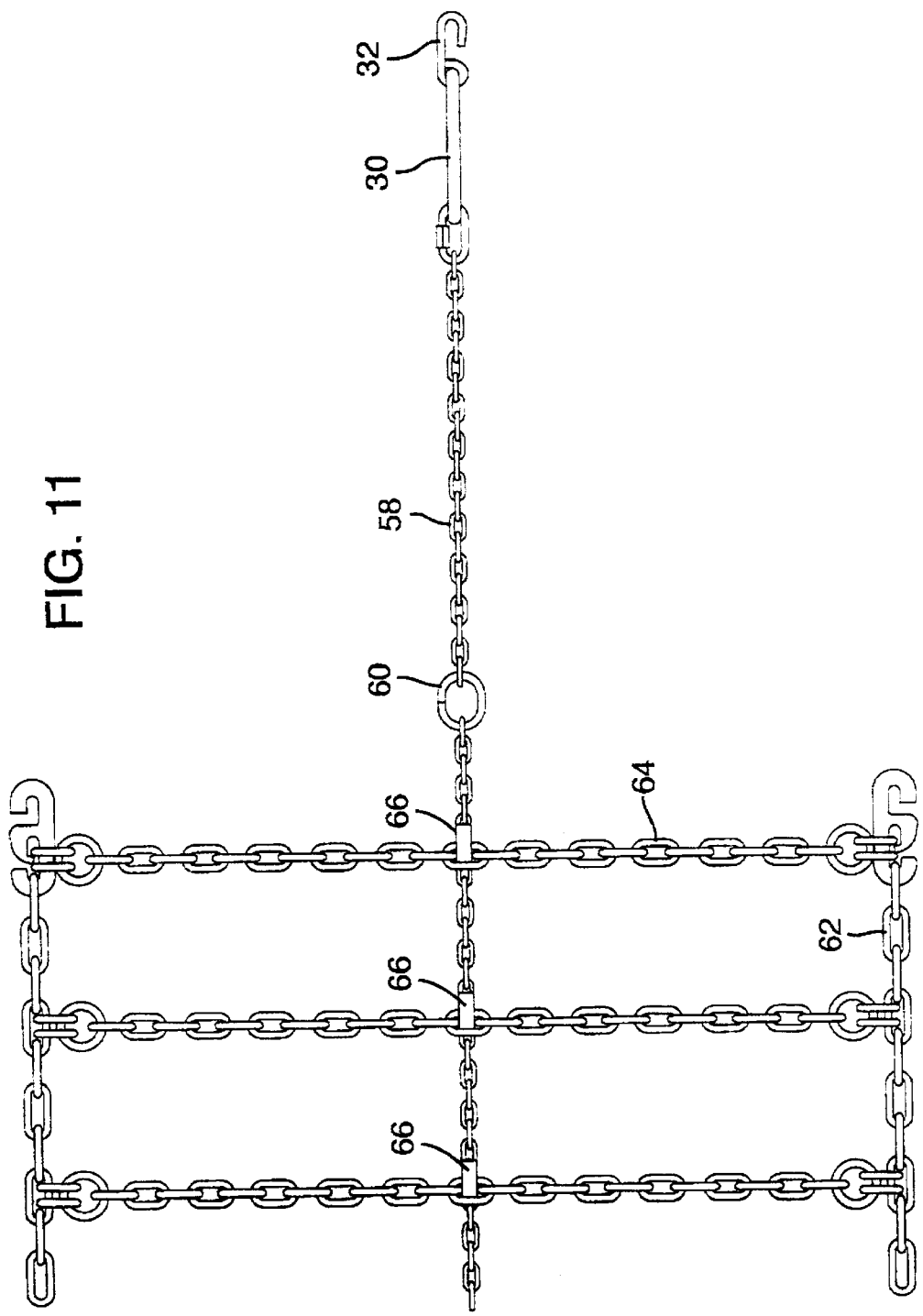

FIGS. 11 and 12 illustrate a further ladder type tire chain but having chain link side members 62 and chain link cross members 64. As in the version of FIGS. 9 and 10, the connections of the cross members to the side members are known to the art. Positioned at each mid or center position of each cross member 64 is a connector 66 including an eyelet 68. A tensioning or cinch line 58 extends through eyelets 68 in the same manner as described for the version of FIGS. 9 and 10. Similarly the cinch line is tightened in the same manner. It will be further appreciated that further versions could be generated whereby the side members are cable and the cross members are chain links and/or vice versa.

It is considered novel to provide a traction device for a dual wheel set wherein the tightening of the chain to the tire set is achieved by cinching of the traction device at its girth between the two tires. To accomplish such tightening, a cinch line is provided that would draw the device inwardly in a manner similar to a drawstring. It is beneficial to structure the traction device so as to be readily collapsible at its center line between the tires which is provided for in the first disclosed structure by the cross-members being formed of opposed loops that readily pivot inwardly at the point of connection i.e., connectors 18. These same connectors provide the desired eyelets 24 that allow the cinch line to easily slide through the connectors. An appreciation of these benefits will enable a person skilled in the art to apply the invention to other types of traction devices.

Accordingly, this invention is intended to apply to dual wheel traction devices in general as determined by the terms of the claims appended hereto.

The invention claimed is:

1. A traction device for a dual wheel set comprising:

a pair of side-members to be applied at the inner and outer sides of a dual wheel set including side-by-side tires each having a peripheral tread for road engagement and defining a juncture therebetween, and a plurality of cross-members extended between the side-members and positioned at spaced locations around the periphery of the side-by-side tires and across the defined juncture;

a cinch line extended in parallel relation to the side members at the center of said cross-members and circumscribing the defined juncture with the traction device mounted on said dual wheel set, said cinch line having cooperatively configured end portions, one end being a receiving end and the other end having a length slidably insertable through the receiving end for shortening of the cinch line and drawing of the cross-members inwardly toward the juncture for tightening of the traction device on to the dual wheel set.

2. A traction device as defined in claim 1 wherein said cooperatively configured end portions include a slide ring at said one end portion and a handle grip at the said other end portion that fits through the slide ring and accommodates cinch like tightening of the cinch line.

3. A traction device as defined in claim 1 wherein the traction device is a cable type traction device and said cross-members are cooperative opposing loops of cable having ends connected to the side-members, connectors connecting the opposing loops together at their apexes, said connectors provided with an eyelet through which the cinch line is slidably extended.

4. A traction device is defined in claim 2 wherein the length of the cinch line between the slide ring and handle portion as mounted on the tire is adjustable.

5. A traction device is defined in claim 2 wherein the cinch line at said other end at least in part is interconnected links of chain and includes a hook like end connection that extends through the slide ring and back along said other end for connection into any of the interconnected links.

6. A traction device as defined in claim 1 wherein the cross members extend between the side members to form a ladder type traction device, and a connector attached to each cross member at a mid position located at the defined juncture of the wheel set as applied to the wheel set.

7. A traction device as defined in claim 6 wherein the side members are one of either a cable type cross member or chain link type cross member, and the cross members are one of either a cable type cross member or chain link type cross member.

8. A process of mounting a flexible traction device to a dual wheel set which defines a juncture therebetween that comprises;

wrapping the flexible traction device around the tread of a dual wheel set with cross-members extended across the juncture;

providing a cinch line that surrounds the juncture and is slidably connected to the cross-members where the cross-members extend across said juncture; and shortening the effective length of the cinch line by a cinching procedure to draw the cross-members into the juncture and thereby tightening the traction device on the dual wheel set.

* * * * *